(12) United States Patent
Berhanu et al.

(10) Patent No.: US 7,529,962 B1
(45) Date of Patent: May 5, 2009

(54) SYSTEM FOR EXPANDING A WINDOW OF VALID DATA

(75) Inventors: Malede Wondmagegne Berhanu, Colchester, VT (US); Christopher Douglas Hanudel, Williston, VT (US); Mark William Kuemerle, Essex Junction, VT (US); David Wills Milton, Underhill, VT (US); Clarence Rosser Ogilvie, Huntington, VT (US); Jack Robert Smith, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/098,038

(22) Filed: Apr. 4, 2008

(51) Int. Cl.
*G06F 1/04* (2006.01)
*H04L 7/00* (2006.01)

(52) U.S. Cl. .................... 713/600; 716/6; 375/354

(58) Field of Classification Search ............... 713/600; 716/6; 375/354
See application file for complete search history.

(56) References Cited

U.S. PATENT DOCUMENTS 4,417,286 A * 11/1983 Anderson .............. 360/51
5,115,455 A     5/1992  Samaras et al. ........... 375/106
5,359,630 A    10/1994  Wade et al. ................ 375/106
5,467,311 A    11/1995  Wiedmann et al. ..... 365/189.05
5,577,236 A    11/1996  Johnson et al. ........... 395/551
6,401,213 B1 *  6/2002  Jeddeloh .................. 713/401
6,889,336 B2 *  5/2005  Schoenfeld et al. ........ 713/503
7,012,956 B1 *  3/2006  Thomsen et al. .......... 375/224
7,080,275 B2 *  7/2006  Abedifard et al. ......... 713/401
7,236,551 B2 *  6/2007  Joordens et al. .......... 375/354
7,272,742 B2 *  9/2007  Schoenfeld et al. ........ 713/503
2006/0181320 A1 * 8/2006 Dreps et al. ................ 327/175
2007/0121397 A1  5/2007  Lee et al. .................. 365/201

* cited by examiner

*Primary Examiner*—Chun Cao
(74) *Attorney, Agent, or Firm*—Zilka-Kotab, PC

(57) ABSTRACT

In one general embodiment, a design structure is provided including a first delay line having at least one buffer, the first delay line being for shifting a clock, a second delay line having at least one buffer, the second delay line being for shifting data, and a logic block adapted to identify a predetermined section of a data window. Additionally, the logic block monitors a clock signal along predetermined portions of the delay line to identify the predetermined section of the data window. Once the predetermined section of the data window is identified the logic block forwards the data associated with the predetermined section to an output pin, with the proviso that no memory element is present, and with the proviso that no feedback line is present.

1 Claim, 2 Drawing Sheets

US 7,529,962 B1

SYSTEM FOR EXPANDING A WINDOW OF VALID DATA

BACKGROUND

The present invention relates to sampling data, and more particularly, this invention relates to expanding valid data windows.

When sampling remote source synchronous data and, more specifically, data received from across a chip, there is typically a window in time when the data is valid. The center of this data window is the best place to sample valid data.

SUMMARY

In one general embodiment, a design structure is provided including a first delay line having at least one buffer, the first delay line being for shifting a clock, a second delay line having at least one buffer, the second delay line being for shifting data, and a logic block adapted to identify a predetermined section of a data window. Additionally, the logic block monitors a clock signal along predetermined portions of the delay line to identify the predetermined section of the data window. Once the predetermined section of the data window is identified the logic block forwards the data associated with the predetermined section to an output pin, with the proviso that no memory element is present, and with the proviso that no feedback line is present.

Other aspects, advantages and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

In one general embodiment, a design structure is provided including a first delay line having at least one buffer, the first delay line being for shifting a clock, a second delay line having at least one buffer, the second delay line being for shifting data, and a logic block adapted to identify a predetermined section of a data window. Additionally, the logic block monitors a clock signal along predetermined portions of the delay line to identify the predetermined section of the data window. Once the predetermined section of the data window is identified the logic block forwards the data associated with the predetermined section to an output pin, with the proviso that no memory element is present, and with the proviso that no feedback line is present.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

With reference to source synchronous data and data from across a chip, there is typically a data window in time. The center of this data window is the most likely place to sample valid data. In a typical on-chip environment where SDR (as opposed to DDR) data and clock are sent a long distance, there may be some skew between the clock and the data signals(s) at the far end. Since the nature of skew is that it can shift the relative timing in either direction, the time to sample tile incoming (remote) data will be optimal near the falling edge of the remote clock, which occurs approximately half way between the points where the data changes. Since the sample clock will be a local clock which may jitter with respect to the remote clock, it may be difficult to reliably capture that data in the center of the "eye".

Figure 1:
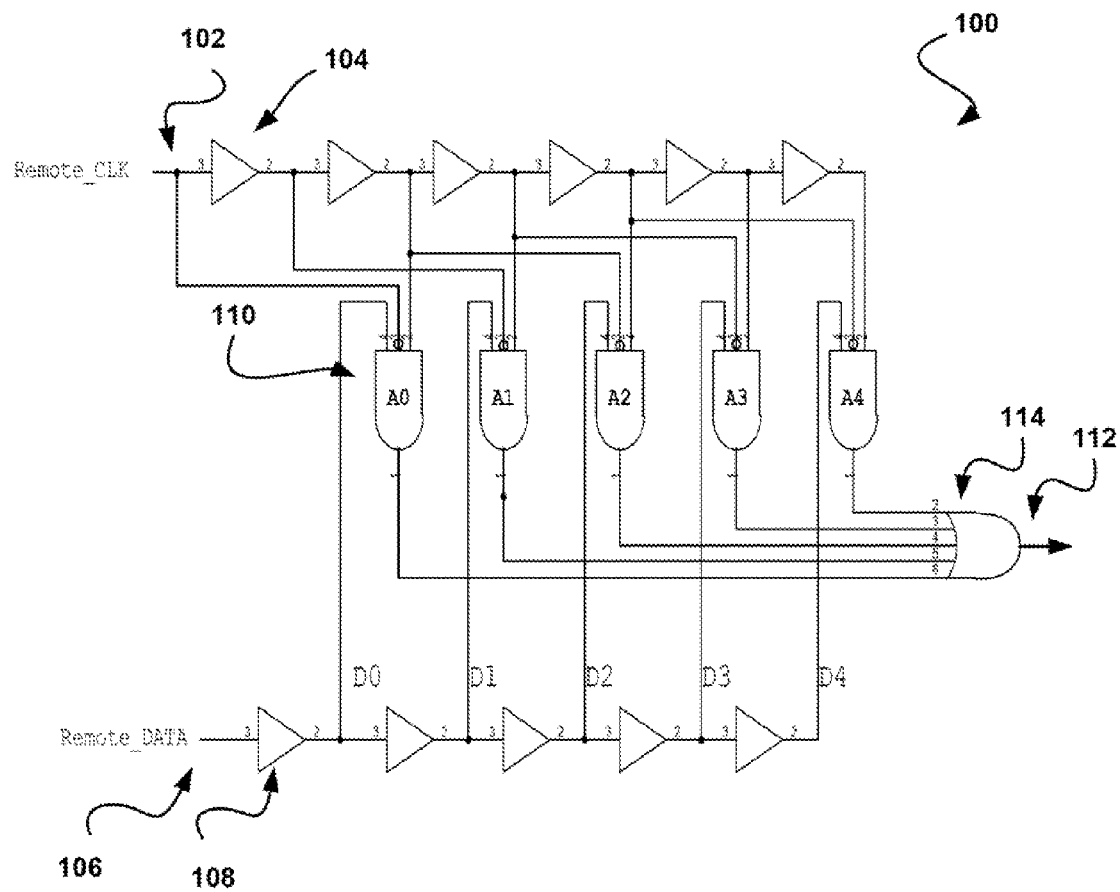
FIG. 1 shows a circuit for expanding a window of valid data, in accordance with one embodiment.

FIG. 1 shows a circuit 100 for expanding a window of valid data, in accordance with one embodiment. As shown, the circuit 100 includes a first delay line 102 having at least one buffer 104, the first delay line being for shifting a clock, a second delay line 106 having at least one buffer 108, the second delay line being for shifting data, and a logic block 110 adapted to identify a predetermined section of a data window. In this case, the logic block 110 monitors a clock signal along predetermined portions of the delay line to identify the predetermined section of the data window. Once the predetermined section of the data window is identified the logic block 110 forwards the data associated with the predetermined section to an output pin 112, with the proviso that no memory element is present, and with the proviso that no feedback line is present.

Thus, a capture device may be utilized to hold the center of a data window for a relatively long period of time such that the capture process is much easier and more reliable. Using the first order system, with no feedback and no memory, a capture device that is not as susceptible to the influence of noise on power and ground may be employed. Furthermore, by capturing small eye widths, setup and hold time requirements for storage elements (e.g. flip-flops or latches) need not be met.

As an example, assume that buffers in the circuit 100 are 10 ps delay elements. Further assume that at an arbitrary time t=0, the remote clock has a falling edge and the remote data is at the center of its eye. At this time (0 ps), A0 is activated for 20 ps and feeds the data from 10 ps before the falling edge until 10 ps after the falling edge into an OR gate 114.

10 ps later, A1 is activated for 20 ps, and feeds the data from 10 ps before the falling edge until 10 ps after the falling edge into the OR gate. 10 ps later (a total of 20 ps from the arrival of the falling edge of the remote clock) A2 is activated for 20 ps and feeds the data from 10 ps before the falling edge until 10 ps after the falling edge into the OR gate. At this time A0 is de-activated. 10 ps later (a total of 30 ps from the arrival of the falling edge of the remote clock) A3 is activated for 20 ps and feeds the data from 10 ps before the falling edge until 10 ps after the falling edge into the OR gate. At this time A1 is de-activated.

10 ps later (a total of 40 ps from the arrival of the falling edge of the remote clock) A4 is activated for 20 ps and feeds the data from 10 ps before the falling edge until 10 ps after the falling edge into the OR gate. At this time A2 is de-activated. 10 ps later (a total of 50 ps from the arrival of the falling edge of the remote clock) A3 is de-activated. 10 ps later (a total of 60 ps from the arrival of the falling edge of the remote clock) A4 is de-activated.

For 60 ps, the OR gate has had on at least one of its legs the remote data covering the time interval of 10 ps before to 10 ps after the falling edge of the remote clock. If the 20 ps of data around the falling edge of the remote clock was in fact all the valid data (e.g. because the eye is only 20 ps big), then, at the output of the OR gate, there is valid data which lasts for 60 ps. Thus, the valid data window (i.e. the eye) has been expanded from 20 ps to 60 ps.

Figure 2:
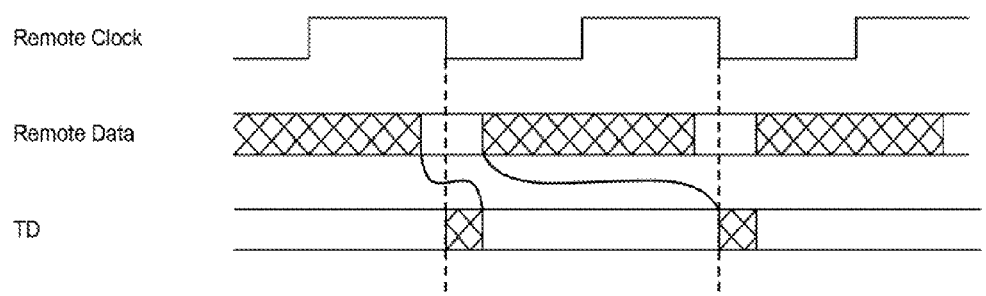
FIG. 2 shows a timing diagram of the circuit of FIG. 1, in accordance with one embodiment.

By adding more stages of delay, the eye may be opened even further. By adding a little delay at the input of the remote clock or the remote data, the part of the eye being stretched to last longer may be adjusted. Additionally, by choosing a smaller delay element, an even smaller eye may be opened. FIG. 2 shows a timing diagram of the circuit 100 of FIG. 1, in accordance with one embodiment.

Using this circuit 100, a pair of delay lines may be utilized to shift a received clock and received data. Furthermore, logic that finds the center of the data eye may be utilized to produce a widened eye at the output pin. As shown, each delay line may contain a group of buffer elements connected in series. The value of the clock signal may be monitored at several locations in the delay line to detect when the center of the data valid window occurs. When the center is found, the associated data may be propagated forward to an output port. As an option, an overlapping scheme may be utilized to widen the center of the eye. Furthermore, various other techniques may be employed utilizing the circuit 100.

For example, in one embodiment, a transmitting device of the circuit 100 may send data on the rising edge of the remote clock, such that the optimal point for sampling incoming data (at the receiving device) is at the falling edge of remote clock. In another case, the transmitting device may send data on the falling edge of the remote clock, such that the optimal point for sampling incoming data (at the receiving device) is at the rising edge of remote clock.

Figure 3:
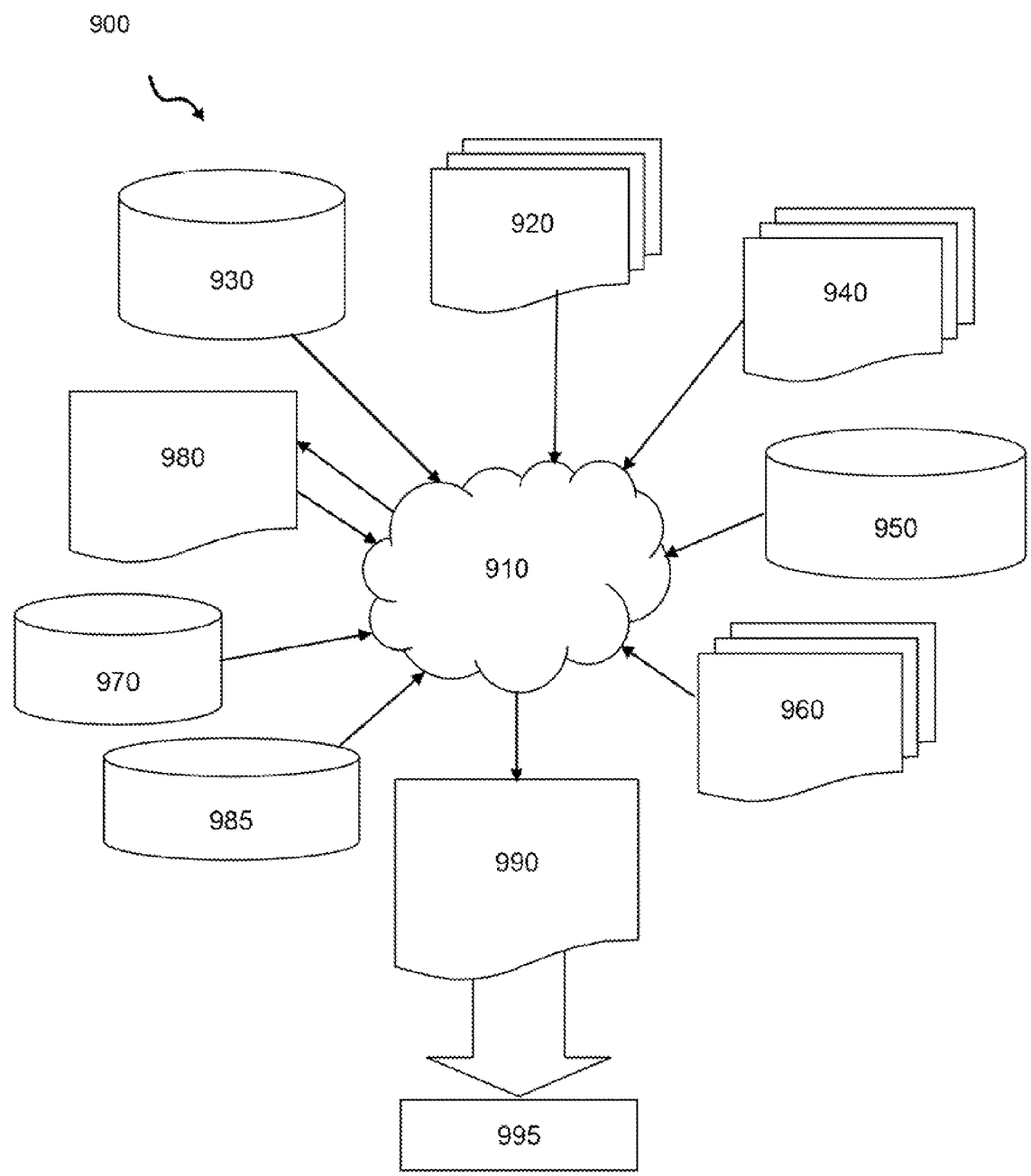
FIG. 3 is a flow diagram of a design process used in semiconductor design, manufacture, and/or test.

FIG. 3 shows a block diagram of an exemplary design flow 900 used for example, in semiconductor design, manufacturing, and/or test. Design flow 900 may vary depending on the type of IC being designed. For example, a design flow 900 for building an application specific IC (ASIC) may differ from a design flow 900 for designing a standard component. Design structure 920 is preferably an input to a design process 910 and may come from an IP provider, a core developer, or other design company or may be generated by the operator of the design flow, or from other sources. Design structure 920 comprises an embodiment of the invention as shown in FIGS. 1 and 2 in the form of schematics or HDL, a hardware-description language (e.g., Verilog, VHDL, C, etc.). Design structure 920 may be contained on one or more machine readable medium. For example, design structure 920 may be a text file or a graphical representation of an embodiment of the invention as shown in FIGS. 1 and 2. Design process 910 preferably synthesizes (or translates) an embodiment of the invention as shown in FIGS. 1 and 2 into a netlist 980, where netlist 980 is, for example, a list of wires, transistors, logic gates, control circuits, I/O, models, etc. that describes the connections to other elements and circuits in an integrated circuit design and recorded on at least one of machine readable medium. For example, the medium may be a CD, a compact flash, other flash memory, a packet of data to be sent via the Internet, or other networking suitable means. The synthesis may be an iterative process in which netlist 980 is resynthesized one or more times depending on design specifications and parameters for the circuit.

Design process 910 may include using a variety of inputs; for example, inputs from library elements 930 which may house a set of commonly used elements, circuits, and devices, including models, layouts, and symbolic representations, for a given manufacturing technology (e.g., different technology nodes, 32 nm, 45 nm, 90 nm, etc.), design specifications 940, characterization data 950, verification data 960, design rules 970, and test data files 985 (which may include test patterns and other testing information). Design process 910 may further include, for example, standard circuit design processes such as timing analysis, verification, design rule checking, place and route operations, etc. One of ordinary skill in the art of integrated circuit design can appreciate the extent of possible electronic design automation tools and applications used in design process 910 without deviating from the scope and spirit of the invention. The design structure of the invention is not limited to any specific design flow.

Design process 910 preferably translates an embodiment of the invention as shown in FIGS. 1 and 2, along with any additional integrated circuit design or data (if applicable), into a second design structure 990. Design structure 990 resides on a storage medium in a data format used for the exchange of layout data of integrated circuits and/or symbolic data format (e.g. information stored in a GDS11 (GDS2), GL1, OASIS, map files, or any other suitable format for storing such design structures). Design structure 990 may comprise information such as, for example, symbolic data, map files, test data files, design content files, manufacturing data, layout parameters, wires, levels of metal, vias, shapes, data for routing through the manufacturing line, and any other data required by a semiconductor manufacturer to produce an embodiment of the invention as shown in FIGS. 1 and 2. Design structure 990 may then proceed to a stage 995 where, for example, design structure 990 proceeds to tape-out, is released to manufacturing, is released to a mask house, is sent to another design house, is sent back to the customer, etc.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A design structure comprising:
   a first delay line having at least one buffer, the first delay line being for shifting a clock;
   a second delay line having at least one buffer, the second delay line being for shifting data; and
   a logic block adapted to identify a predetermined section of a data window;
   wherein the logic block monitors a clock signal along predetermined portions of the delay line to identify the predetermined section of the data window; and
   once the predetermined section of the data window is identified the logic block forwards the data associated with the predetermined section to an output pin,
   with the proviso that no memory element is present,
   with the proviso that no feedback line is present.

* * * * *